US012104768B1

(12) United States Patent
Iino

(10) Patent No.: US 12,104,768 B1
(45) Date of Patent: Oct. 1, 2024

(54) LIGHTING DEVICE

(71) Applicant: DAI-ICHI SHOMEI CO., LTD., Tokyo (JP)

(72) Inventor: Kohhei Iino, Tokyo (JP)

(73) Assignee: DAI-ICHI SHOMEI CO., LTD., Tokyo (JP)

( * ) Notice: Subject to any disclaimer, the term of this patent is extended or adjusted under 35 U.S.C. 154(b) by 0 days.

(21) Appl. No.: 18/573,757

(22) PCT Filed: Jul. 25, 2022

(86) PCT No.: PCT/JP2022/028615
§ 371 (c)(1),
(2) Date: Dec. 22, 2023

(87) PCT Pub. No.: WO2023/026741
PCT Pub. Date: Mar. 2, 2023

(30) Foreign Application Priority Data

Aug. 23, 2021 (JP) ................................ 2021-135655

(51) Int. Cl.
*F21V 13/02* (2006.01)
*F21V 5/00* (2018.01)
(Continued)

(52) U.S. Cl.
CPC ................ *F21V 13/02* (2013.01); *F21V 5/00* (2013.01); *F21V 14/04* (2013.01); *F21V 14/08* (2013.01);
(Continued)

(58) Field of Classification Search
CPC .......... F21V 13/02; F21V 14/04; F21V 14/08; F21V 7/0008
See application file for complete search history.

(56) References Cited

U.S. PATENT DOCUMENTS 10,845,030 B1 * 11/2020 Tornyai .................. F21V 5/007
2004/0037082 A1 * 2/2004 Schmidt ................. F21V 13/02
362/351

(Continued)

FOREIGN PATENT DOCUMENTS

JP 2002-94129 3/2002
JP 2017-103051 6/2017

OTHER PUBLICATIONS

International Search Report issued Sep. 27, 2022 in International (PCT) Application No. PCT/JP2022/028615.

(Continued)

*Primary Examiner* — Christopher E Dunay
(74) *Attorney, Agent, or Firm* — Wenderoth, Lind & Ponack, L.L.P.

(57) ABSTRACT

A lighting device includes a lighting device cover having an emission opening; a light emitting element fixed to the lighting device cover, the light emitting element configured to emit the light along a lighting direction from the emission opening toward one side of the lighting device; a diffusion plate fixed to the lighting device cover to be disposed on one side of the light emitting element, and configured to diffuse the light emitted from the light emitting element; a shutter fixed to the lighting device cover to be disposed on one side of the diffusion plate, the shutter configured to change a lighting range of the light diffused by the diffusion plate; and a light reflective member fixed to the lighting device cover be disposed on one side of the shutter.

3 Claims, 8 Drawing Sheets

(51) Int. Cl.
*F21V 14/04* (2006.01)
*F21V 14/08* (2006.01)
*F21Y 113/13* (2016.01)
*F21Y 115/10* (2016.01)

(52) U.S. Cl.
CPC ........ *F21Y 2113/13* (2016.08); *F21Y 2115/10* (2016.08)

(56) References Cited

U.S. PATENT DOCUMENTS

| | | | | |
|---|---|---|---|---|
| 2018/0180268 | A1* | 6/2018 | Jurik | G02B 19/0066 |
| 2019/0219249 | A1* | 7/2019 | David | H05B 45/20 |
| 2022/0282852 | A1* | 9/2022 | Høyer | F21V 7/0041 |
| 2022/0357016 | A1* | 11/2022 | Angelini | F21V 21/30 |
| 2022/0395593 | A1* | 12/2022 | Allen | A61L 2/10 |

OTHER PUBLICATIONS

International Preliminary Report on Patentability issued Feb. 27, 2024 in International (PCT) Application No. PCT/JP2022/028615.

* cited by examiner

LIGHTING DEVICE

TECHNICAL FIELD

The present invention relates to a lighting device.

BACKGROUND ART

For example, in the medical field, a lighting device including a light emitting element such as a light emitting diode (LED) is known.

The light emitted from the light emitting element along the lighting direction toward one side of the lighting device includes light emitted straight along the lighting direction and light emitted obliquely from the lighting direction. The light obliquely emitted from the lighting direction may be totally reflected by, for example, an interface of a resin member attached to the lighting device, and may be emitted further away from the lighting direction. In this case, since a part of the light emitted from the light emitting element deviates from the lighting direction, there is a possibility that the lighting device cannot emit light with desired brightness along the lighting direction.

For example, Patent Document 1 discloses a lighting device which includes a resin interface that totally reflects light deviated from a lighting range required to be irradiated with light and a light reflective member, and in which a positional relationship among the light emitting element, the resin interface, and the light reflective member is determined so that the light emitted from the light emitting element is totally reflected at least once or more by each of the resin interface and the light reflective member and gathers in the lighting range.

PRIOR ART DOCUMENT

Patent Document

Patent Document 1: JP-A-2002-94129

According to such a lighting device, the light deviated from the lighting direction toward one side of the lighting device is totally reflected by the resin interface and the light reflective member so as to be emitted again along the lighting direction, whereby the light can be applied along the lighting direction with desired brightness.

As described above, it is preferable that the lighting device can apply light along the lighting direction with desired brightness. Therefore, there is a demand for a lighting device that includes a resin interface and a light reflective member which have a shape capable of more reliably emitting light deviated from the lighting direction along the lighting direction.

SUMMARY OF THE INVENTION

Problems to be Solved by the Invention

Therefore, an object of the present invention is to provide a lighting device that includes a light reflective member configured to be capable of more reliably emitting light deviated from the lighting direction along the lighting direction.

Solutions to the Problems

In order to solve the above problems, the present invention has the following configurations.

A lighting device according to the present invention is a lighting device that emits light, the lighting device including:

- a lighting device cover having an emission opening;
- a light emitting element fixed to the lighting device cover, the light emitting element configured to emit the light along a lighting direction from the emission opening toward one side of the lighting device;
- a diffusion plate fixed to the lighting device cover so as to be disposed on one side with respect to the light emitting element, the diffusion plate configured to diffuse the light emitted from the light emitting element;
- a shutter fixed to the lighting device cover so as to be disposed on one side with respect to the diffusion plate, the shutter configured to change a lighting range of the light diffused by the diffusion plate; and
- a light reflective member fixed to the lighting device cover so as to be disposed on one side with respect to the shutter, the light reflective member having a resin interface, the resin interface configured to totally reflect a part of the light having passed through the shutter and then to emit the part of the light along the lighting direction.

The light reflective member includes, on one side, a transmission interface through which the light is allowed to pass.

The resin interface includes:

- an inner protruding resin interface formed so as to surround an outer periphery of the emission opening and protruding toward another side, and
- an outer protruding resin interface formed so as to surround an outer periphery of the inner protruding resin interface and protruding toward another side.

According to the present invention, a lighting device includes: an inner protruding resin interface formed so as to surround an outer periphery of a shutter and protruding toward the other side; and an outer protruding resin interface formed so as to surround an outer periphery of the inner protruding resin interface and protruding toward the other side. By the inner protruding resin interface and outer protruding resin interface, the light having passed through the shutter and having been reflected toward the other side at the transmission interface is totally reflected at the inner protruding resin interface or the outer protruding resin interface and emitted again along the lighting direction. Therefore, it is possible to provide a lighting device that includes a light reflective member configured to be capable of more reliably emitting light deviated from the lighting direction along the lighting direction.

In addition, the light emitting element may include: a plurality of first LEDs having a first color temperature, and a plurality of second LEDs having a second color temperature. The first LEDs and the second LEDs may be alternately arranged.

According to the present configuration, the color temperature of the entire light emitting element can be controlled by turning on, in a predetermined combination, the first LEDs and the second LEDs alternately arranged.

In addition, the shutter may be configured to change a lighting range of the light in a plurality of stages.

According to the present configuration, the lighting range can be freely changed and be irradiated with light.

Effects of the Invention

Therefore, it is possible to provide a lighting device including a light reflective member configured to more reliably direct light deviated from one side toward the one side.

DESCRIPTION OF EMBODIMENT

Figure 1:
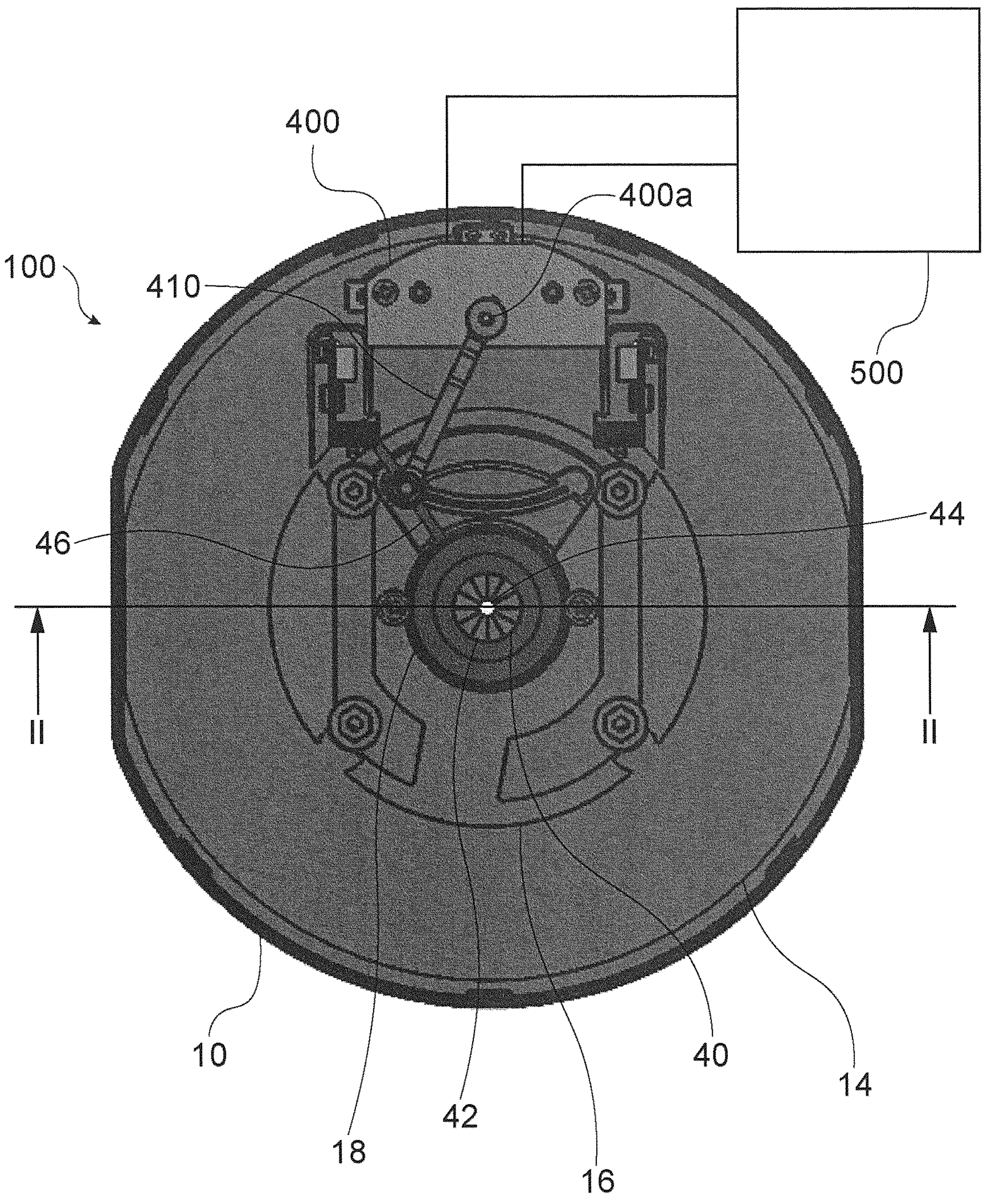
FIG. 1 is a diagram showing a lighting device according to an embodiment of the present invention.

Hereinafter, the present invention will be described based on an embodiment shown in the drawings.

[Overview of Lighting Device]

FIG. 1 is a diagram showing a lighting device according to an embodiment of the present invention.

As shown in FIG. 1, a lighting device 100 according to an embodiment of the present invention includes a substantially circular lighting device cover 10.

Figure 2:
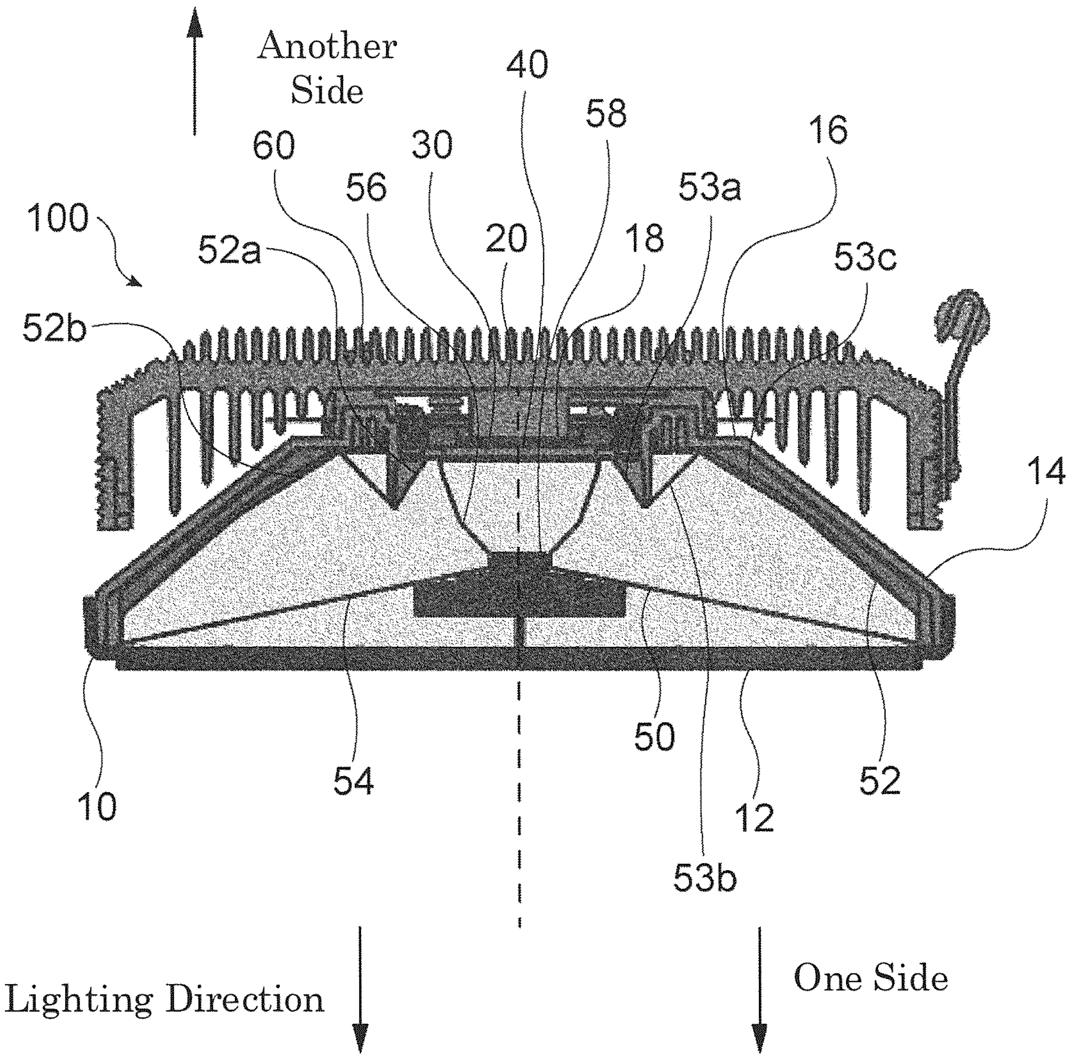
FIG. 2 is a cross-sectional view of the lighting device taken along line II-II in FIG. 1.

FIG. 2 is a cross-sectional view of the lighting device 100 taken along line II-II in FIG. 1.

As shown in FIG. 2, the lighting device cover 10 has a substantially circular cover opening 12 on one side. In addition, the lighting device cover 10 has a cover inclined surface portion 14 that protrudes so as to be inclined radially inward as it goes from the one side toward the other side, on the other side with respect to the cover opening 12. Therefore, the inside of the lighting device cover 10 is hollow and is formed in a substantially conical shape.

The lighting device cover 10 is provided with a flat cover flat portion 16 at an end portion on the other side with respect to the cover inclined surface portion 14 so that the cover flat portion 16 is positioned substantially at the center of the lighting device cover 10. A circular emission opening 18 is provided at the center of the cover flat portion 16. A light emitting element 20 configured to emit light along the lighting direction from the emission opening 18 toward the one side of the lighting device 100 is attached to the other side of the cover flat portion 16.

In addition, on the other side of the cover flat portion 16 of the lighting device cover 10, a circular diffusion plate 30 is attached which is disposed on the one side with respect to the light emitting element 20 and configured to diffuse the light emitted from the light emitting element 20 toward the one side.

Furthermore, on the other side of the cover flat portion 16 of the lighting device cover 10, a circular shutter 40 arranged on the one side with respect to the diffusion plate 30 and configured to change the lighting range of the light diffused by the diffusion plate 30 is attached.

To the inside surrounded by the cover inclined surface portion 14 and the cover flat surface portion 16 of the lighting device cover 10, a light reflective member 50 disposed on the one side with respect to the shutter 40 and including a resin interface 52 that totally reflects a part of the light passing through the shutter 40 and then emits the light along the lighting direction is attached. The resin interface 52 is configured to be inclined radially inward as it goes from the one side toward the other side along the inner side of the cover inclined surface portion 14, on the other side of the light reflective member 50. In addition, the light reflective member 50 is provided with a transmission interface 54 configured to allow light to pass therethrough at an end portion on the one side with respect to the resin interface 52. The transmission interface 54 is configured to be inclined radially inward as it goes from the one side toward the other side.

In the present embodiment, to the other side of the lighting device cover 10, a heat sink 60 disposed on the other side with respect to the light emitting element 20 and configured to dissipate heat generated from the light emitting element 20 is attached.

[Light Emitting Element]

The light emitting element 20 of the present embodiment will be described in more detail.

Figure 3:
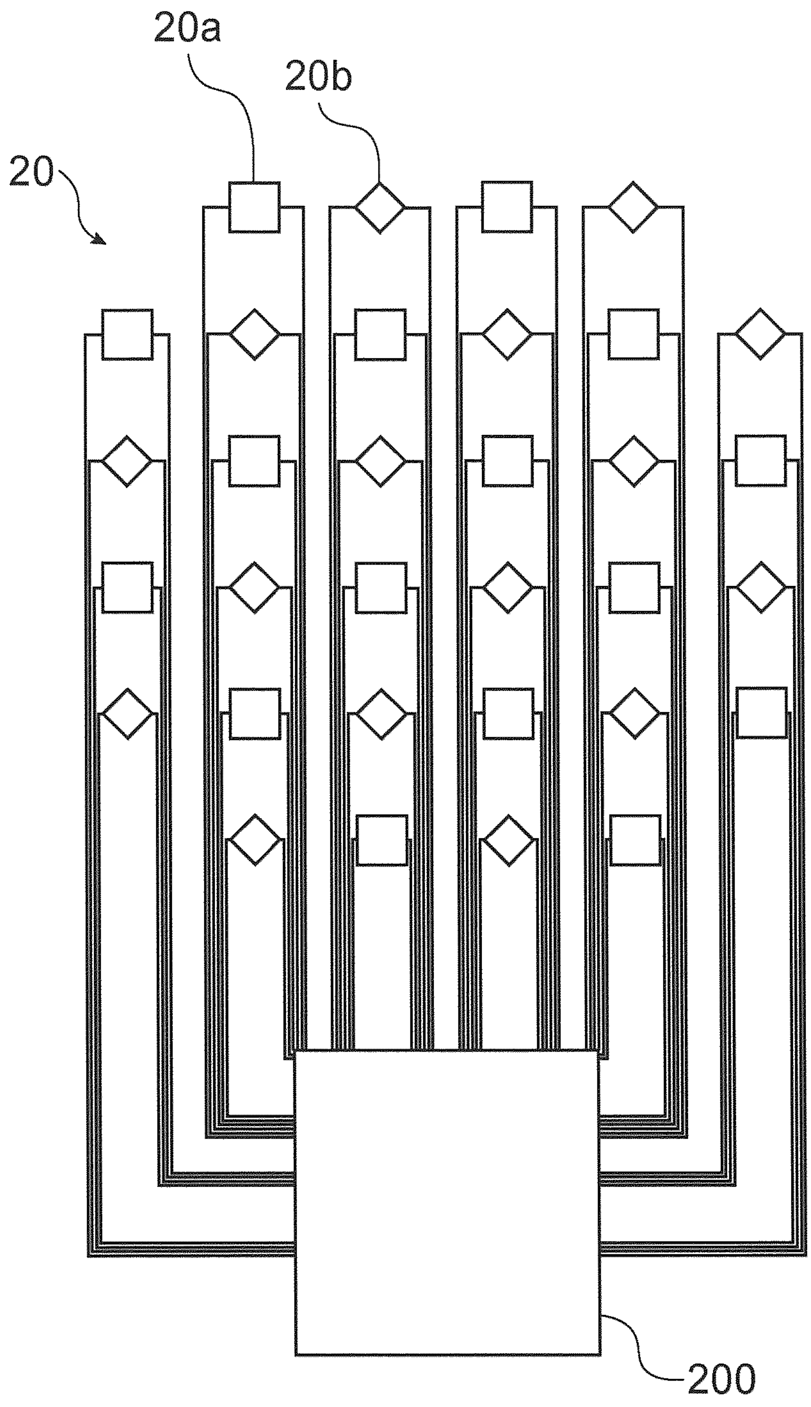
FIG. 3 is a schematic view showing an arrangement of the light emitting element of the lighting device in FIG. 1.

FIG. 3 is a schematic view showing an arrangement of the light emitting element 20 of the lighting device 100 in FIG. 1.

In the present embodiment, the light emitting element 20 includes 16 first LEDs **20*a* having a color temperature (first color temperature) of 6500 K and 16 second LEDs 20*b* having a color temperature (second color temperature) of 3000 K. In FIG. 3, the first LED 20*a* and the second LED 20*b* are shown in a square shape and a rhombus shape, respectively, for the sake of illustration. Each of the actual first LED 20*a* and the second LED 20*b* may have another shape, for example, a circular shape. The first LEDs 20*a* and the second LEDs 20*b*** are alternately arranged so that the entire arrangement forms a substantially cross-shaped polygon.

The first LED **20*a* and the second LED 20*b* are electrically connected to a controller 200 provided outside so that lighting is controlled. The controller 200 is configured to light the first LEDs 20*a* and the second LEDs 20*b* in a predetermined combination. By the combination of the first LEDs 20*a* and the second LEDs 20*b*, the light emitting element 20** is configured to emit light in four stages of 3800 K, 4100 K, 4500 K, and 5000 K as a whole.

[Shutter]

The shutter 40 of the present embodiment will be described in more detail.

In the present embodiment, the shutter 40 is configured as a lens shutter including a plurality of shutter leaves 42.

Returning to FIG. 1, the plurality of shutter leaves 42 are arranged side by side in the circumferential direction along the circular emission opening 18, and are each configured to be movable in the radial direction.

A shutter opening 44 surrounded by a plurality of shutter leaves 42 is provided at the center of the shutter 40. The shutter opening 44 is configured to be larger or smaller by the shutter leaves 42 moving in the radial direction.

In addition, the shutter 40 includes a link member 46 configured to move the shutter leaves 42. The link member 46 extends radially outward with the center of the emission opening 18 as an axis, and is configured to be rotatable around the shutter 40.

A shutter motor 400 including a motor shaft 400*a* is attached to the lighting device cover 10, on the other side with respect to the cover inclined surface portion 14. The shutter motor 400 is electrically connected to a controller 500 provided outside. The controller 500 is configured to rotationally drive the motor shaft 400*a* of the shutter motor 400.

A motor coupling plate 410 is connected to the motor shaft 400*a*. The motor coupling plate 410 extends radially outward with the motor shaft 400*a* as an axis, and is configured to be rotatable around the motor shaft 400*a* by the shutter motor 400 being driven. In addition, the motor coupling plate 410 is connected to the link member 46 of the shutter 40 at an end portion thereof, and is configured to move in conjunction with the link member 46 by the shutter motor 400 being driven. Therefore, when the shutter motor 400 is driven, the motor coupling plate 410 rotates around the motor shaft 400*a*, and at the same time, the link member 46 rotates around the shutter 40 to move the shutter leaves 42.

[Light Reflective Member]

The light reflective member 50 of the present embodiment will be described in more detail.

The light reflective member 50 is provided with a semi-ellipsoidal recessed portion 56 that faces from the other side toward the one side at a substantial center. The entire surface of the recessed portion 56 is a transmission interface through which light can pass. A hole portion 58 penetrating from the other side toward the one side is provided substantially at the center of the recessed portion 56.

As described above, the light reflective member 50 is attached to the inside surrounded by the cover inclined surface portion 14 and the cover flat portion 16 of the lighting device cover 10 so that the recessed portion 56 is coaxial with the emission opening 18.

In addition, the resin interface 52 of the light reflective member 50 includes an inner protruding resin interface 52*a* that is formed to surround the outer periphery of the recessed portion 56 disposed coaxially with the emission opening 18 and protrudes toward the other side. The inner protruding resin interface 52*a* has an inner side surface 53*a* configured to be inclined radially outward as it goes from the other side toward the one side. An end portion on the other side of the inner protruding resin interface 52*a* approaches one side of the cover flat portion 16 of the lighting device cover 10.

Furthermore, the resin interface 52 of the light reflective member 50 includes an outer protruding resin interface 52*b* formed to surround the outer periphery of the inner protruding resin interface 52*a* and protruding toward the other side. The radially inner side of the outer protruding resin interface 52*b* is provided with an intermediate side surface 53*b* that is inclined radially outward as it goes from an end portion of the radially outer side of the inner protruding resin interface 52*a* toward the other side. On the other hand, the radially outer side of the outer protruding resin interface 52*b* is provided with an outer side surface 53*c* that is inclined radially outward as it goes from the other side toward the one side and is connected to an end portion of the radially outer side of the transmission interface 54.

[Method for Operating Lighting Device]

A method for operating the lighting device 100 of the present embodiment will be described in more detail.

Returning to FIG. 3, the controller 200 turns on each of the 16 first LEDs 20*a* and the 16 second LEDs 20*b* of the light emitting element 20 attached to the lighting device 100 in a predetermined combination. The light emitted from the light emitting element 20 by turning on the first LEDs 20*a* and the second LEDs 20*b* travels inside the emission opening 18 along the lighting direction, is diffused by the diffusion plate 30, and then passes through the shutter opening 44 of the shutter 40 (see FIG. 1).

Figure 6:
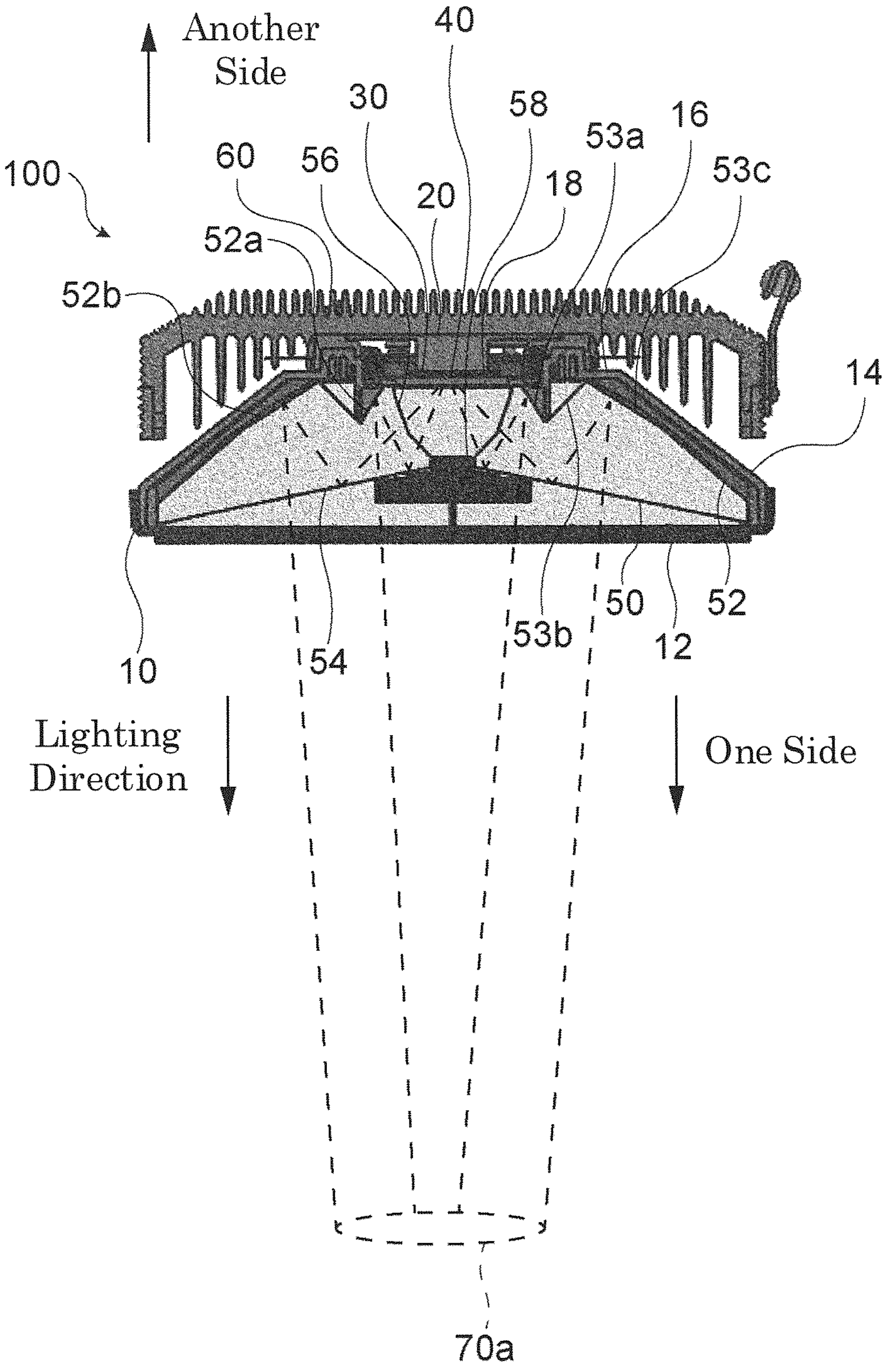
FIG. 6 is an explanatory diagram showing a lighting range of the lighting device in FIG. 1.

FIG. 6 is an explanatory diagram showing a lighting range of the lighting device 100 in FIG. 1.

As shown in FIG. 6, the light having passed through the shutter opening 44 of the shutter 40 is diffused in the radial direction inside the recessed portion 56 of the light reflective member 50. Apart of the diffused light passes through the transmission interface of the recessed portion 56 and is incident on the light reflective member 50. Apart of the light incident on the light reflective member 50 is reflected at the transmission interface 54 provided at an end portion on the one side of the light reflective member 50. The light reflected at the transmission interface 54 is totally reflected at the inner side surface 53*a* provided at the inner protruding resin interface 52*a* of the resin interface 52 or the outer side surface 53*c* provided at the outer protruding resin interface 52*b* of the resin interface 52, and then reaches the transmission interface 54 again, and is emitted from the transmission interface 54 in the lighting direction. Therefore, the light incident on the light reflective member 50 is emitted along the lighting direction to illuminate the inside of the lighting range 70*a*.

Figure 4:
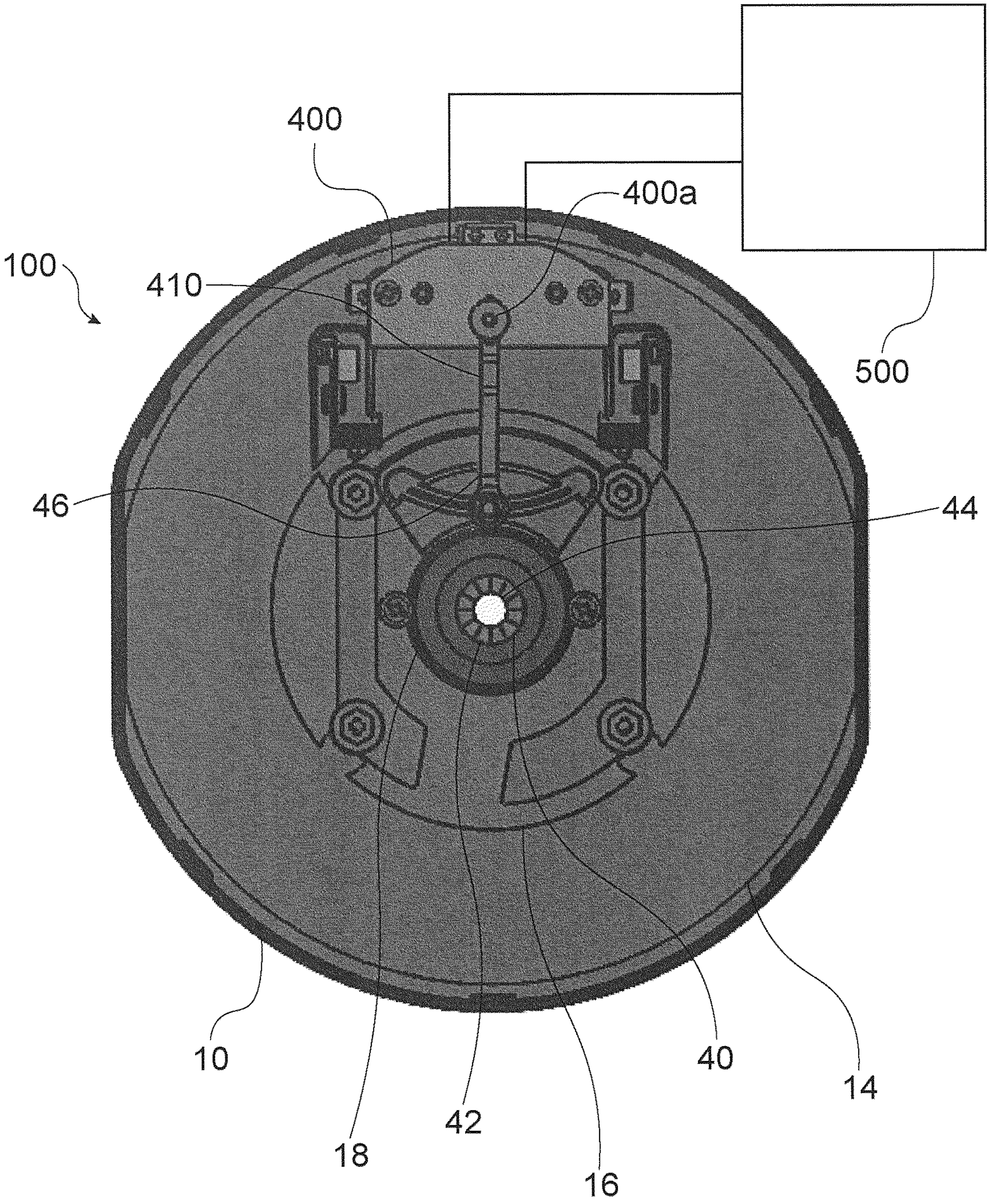
FIG. 4 is an explanatory diagram showing the operation of the shutter of the lighting device in FIG. 1.

FIG. 4 is an explanatory diagram showing the operation of the shutter 40 of the lighting device 100 in FIG. 1.

As shown in FIG. 4, the shutter motor 400 of the shutter 40 is driven by the controller 500. By driving the shutter motor 400, the shutter leaves 42 move in the radial direction through the motor shaft 400*a*, the motor coupling plate 410, and the link member 46 so that the shutter opening 44 of the shutter 40 is larger than that in FIG. 1.

Figure 7:
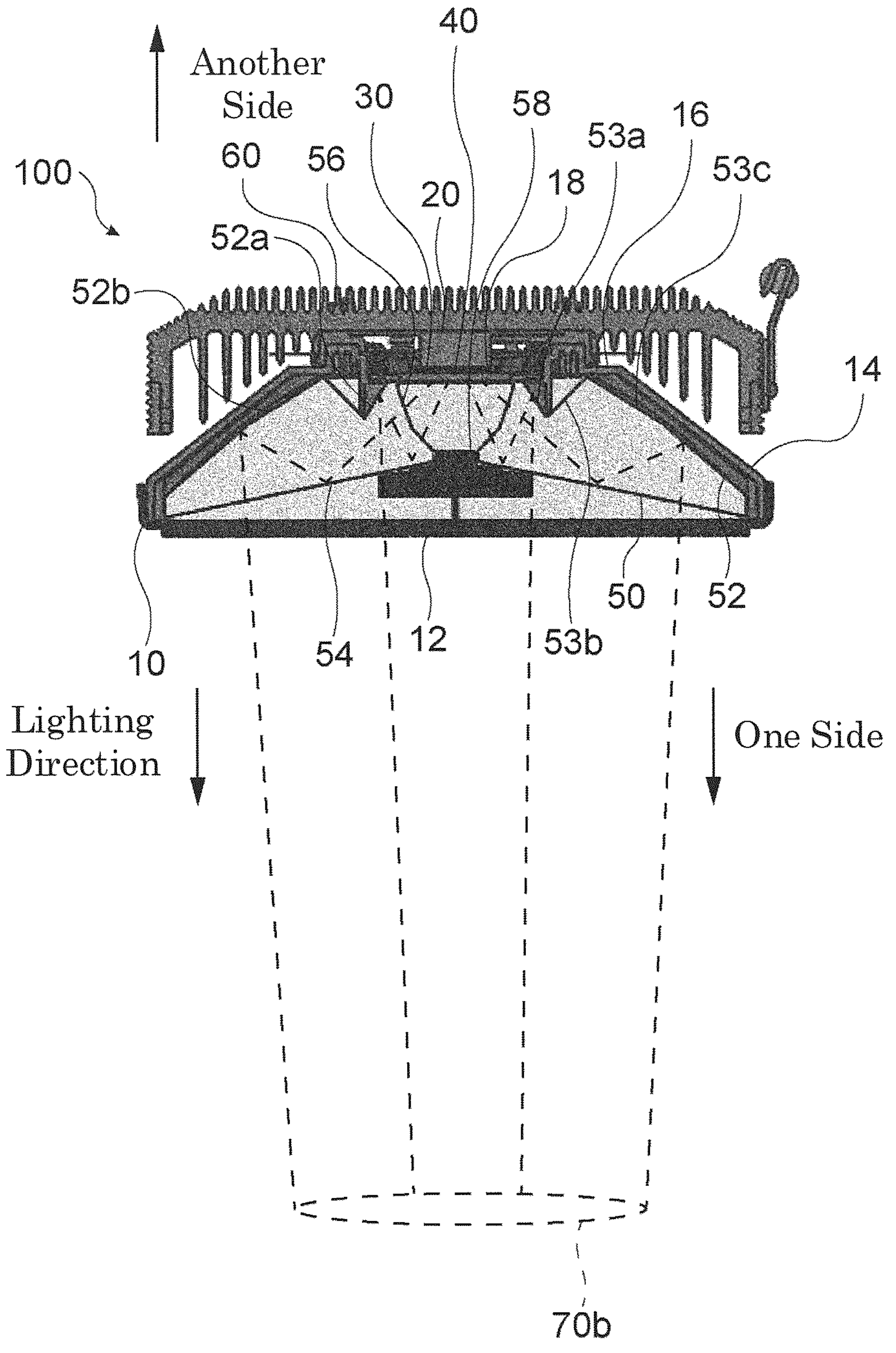
FIG. 7 is an explanatory diagram showing a lighting range of the lighting device in FIG. 4.

FIG. 7 is an explanatory diagram showing a lighting range of the lighting device 100 in FIG. 4.

As shown in FIG. 7, the light having passed through the shutter opening 44 larger than that in FIG. 1 is further diffused in the radial direction than that in FIG. 6 inside the recessed portion 56 of the light reflective member 50. Apart of the diffused light passes through the transmission interface of the recessed portion 56 and is incident on the light reflective member 50. Apart of the light incident on the light reflective member 50 is reflected at the transmission interface 54 provided at an end portion on the one side of the light reflective member 50. The light reflected at the transmission interface 54 is totally reflected at the inner side surface 53*a* provided at the inner protruding resin interface 52*a* of the resin interface 52 or the outer side surface 53*c* provided at the outer protruding resin interface 52*b* of the resin interface 52, and then reaches the transmission interface 54 again, and is emitted from the transmission interface 54 in the lighting direction. Therefore, the light incident on the light reflective member 50 is emitted along the lighting direction to illuminate the inside of the lighting range 70*b*. Since the shutter opening 44 is larger than that in FIG. 1, the lighting range 70*b* is larger than the lighting range 70*a* shown in FIG. 6.

Figure 5:
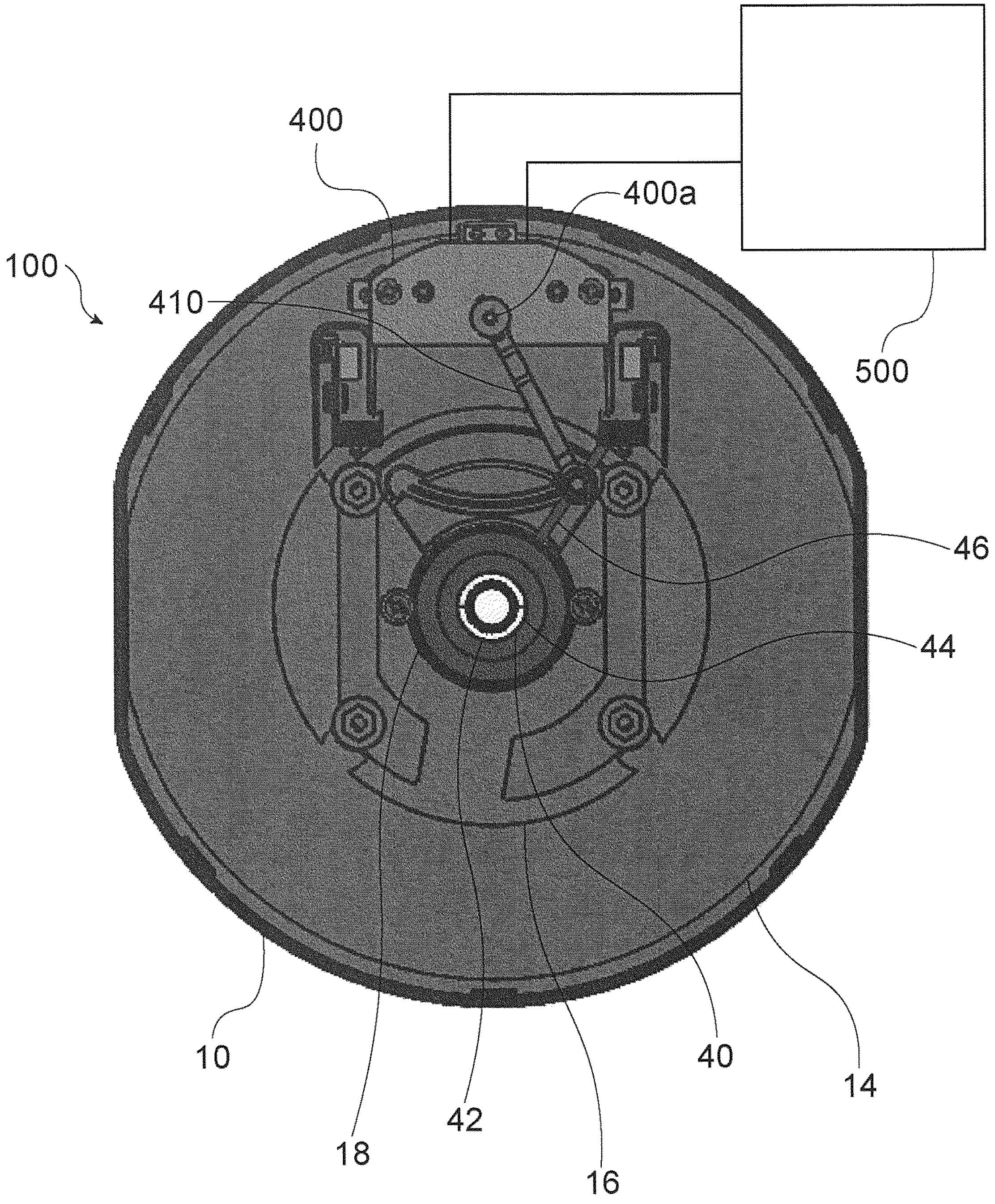
FIG. 5 is an explanatory diagram showing the operation of the shutter of the lighting device in FIG. 1.

FIG. 5 is an explanatory diagram showing the operation of the shutter 40 of the lighting device 100 in FIG. 1.

As shown in FIG. 5, the shutter motor 400 of the shutter 40 is driven by the controller 500. By driving the shutter motor 400, the shutter leaves 42 move in the radial direction through the motor shaft 400*a*, the motor coupling plate 410, and the link member 46 so that the shutter opening 44 of the shutter 40 is larger than that in FIG. 4.

Figure 8:
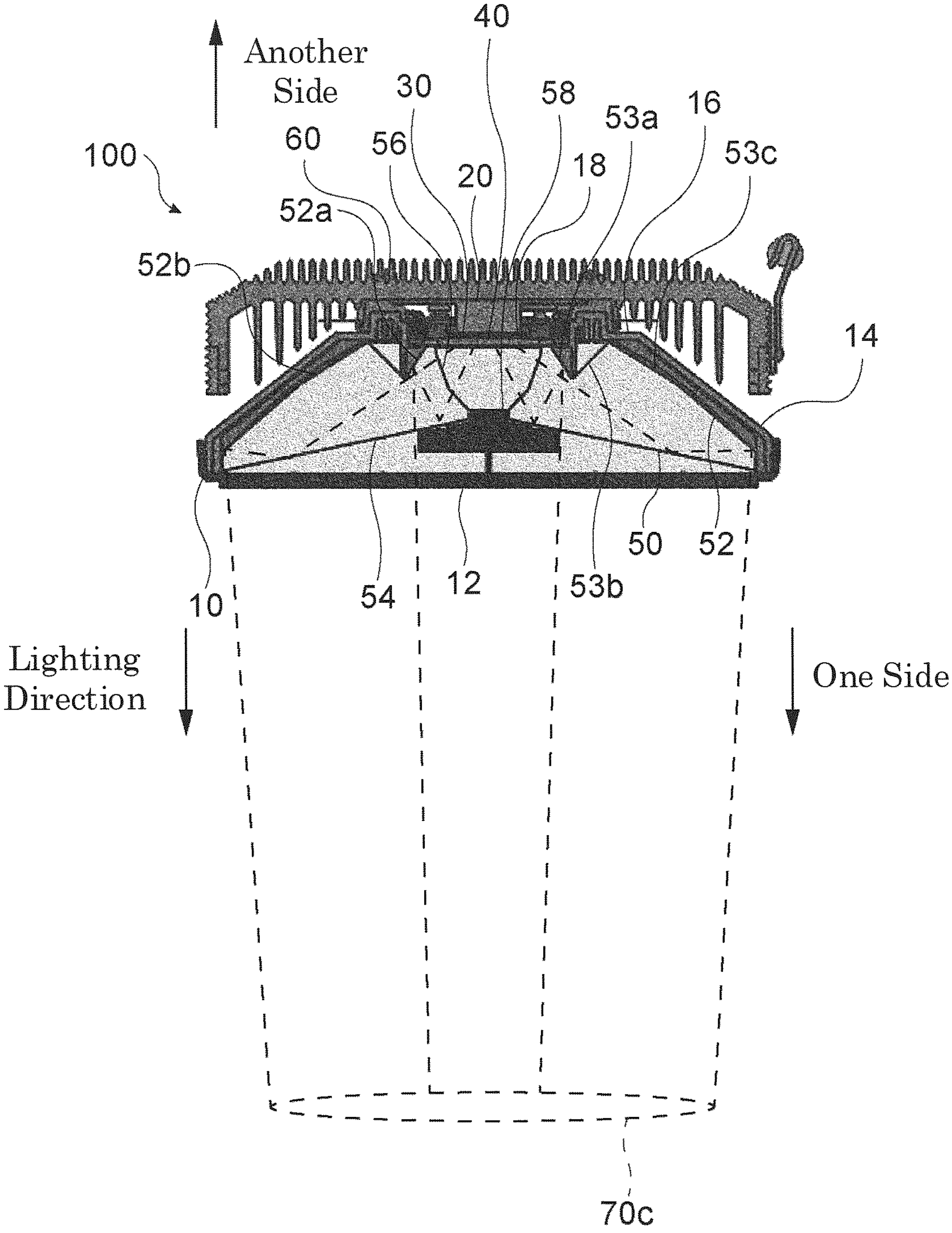
FIG. 8 is an explanatory diagram showing a lighting range of the lighting device in FIG. 5.

FIG. 8 is an explanatory diagram showing a lighting range of the lighting device in FIG. 5.

As shown in FIG. 8, the light having passed through the shutter opening 44 larger than that in FIG. 4 is further diffused in the radial direction than that in FIG. 7 inside the recessed portion 56 of the light reflective member 50. A part of the diffused light passes through the transmission interface of the recessed portion 56 and is incident on the light reflective member 50. A part of the light incident on the light reflective member 50 is reflected at the transmission interface 54 provided at an end portion on the one side of the light reflective member 50. The light reflected at the transmission interface 54 is totally reflected at the inner side surface 53*a* provided at the inner protruding resin interface 52*a* of the resin interface 52 or the outer side surface 53*c* provided at the outer protruding resin interface 52*b* of the resin interface 52, and then reaches the transmission interface 54 again, and is emitted from the transmission interface 54 in the lighting direction. Therefore, the light incident on the light reflective member 50 is emitted along the lighting direction to illuminate the inside of the lighting range 70*c*. Since the shutter opening 44 is larger than that in FIG. 4, the lighting range 70*c* is larger than the lighting range 70*b* shown in FIG. 7.

As described above, the lighting device 100 according to the present embodiment includes the light emitting element 20 that emits light along the lighting direction from the emission opening 18 toward the one side of the lighting device 100, and the light reflective member 50 that is fixed to the lighting device cover 10 so as to be disposed on the one side with respect to the shutter 40 fixed to the lighting device cover 10 so as to be disposed on the one side with respect to the diffusion plate 30, and has the resin interface 52 which totally reflects a part of the light having passed through the shutter 40 and then emits the part of the light along the lighting direction. The resin interface 52 includes an inner protruding resin interface 52*a* formed so as to surround the outer periphery of the emission opening 18 and protruding toward the other side, and an outer protruding resin interface 52*b* formed so as to surround the outer periphery of the inner protruding resin interface 52*a* and protruding toward the other side.

By the above-described inner protruding resin interface 52*a* and outer protruding resin interface 52*b*, the light having passed through the shutter 40 and having been reflected toward the other side at the transmission interface 54 is totally reflected at the inner protruding resin interface 52*a* or the outer protruding resin interface 52*b* and emitted again along the lighting direction. Therefore, it is possible to provide a lighting device 100 that includes a light reflective member 50 configured to be capable of more reliably emitting light deviated from the lighting direction along the lighting direction.

In addition, the light emitting element 20 includes a plurality of first LEDs 20*a* having a first color temperature and a plurality of second LEDs 20*b* having a second color temperature. The first LEDs 20*a* and the second LEDs 20*b* are alternately arranged. Therefore, the color temperature of the entire light emitting element 20 can be controlled by turning on, in a predetermined combination, the first LEDs 20*a* and the second LEDs 20*b* alternately arranged.

In addition, the shutter 40 is configured to change the lighting ranges 70*a*, 70*b*, and 70*c* of light in a plurality of stages. Therefore, the lighting ranges 70*a*, 70*b*, and 70*c* can be freely changed to be irradiated with light.

In the present embodiment, the light emitting element 20 includes 16 first LEDs 20*a* and 16 second LEDs 20*b*, which are alternately arranged so that the entire arrangement forms a substantially cross-shaped polygon. However, for example, the light emitting element may include 32 first LEDs 20*a* and 32 second LEDs 20*b*, which are alternately arranged so that the entire arrangement forms a substantially square.

In the present embodiment, the light emitting element 20 includes the first LEDs 20*a* having the first color temperature and the second LEDs 20*b* having the second color temperature, but may include, for example, three or more kinds of LEDs having color temperatures different from each other.

In the present embodiment, the shutter 40 is configured to change the lighting ranges 70*a*, 70*b*, and 70*c* of light in three stages, but may be configured to change the lighting ranges of light in four or more stages, or continuously change the lighting ranges of light, for example.

In the present embodiment, the resin interface 52 of the light reflective member 50 includes the inner protruding resin interface 52*a* and the outer protruding resin interface 52*b*, but may include three or more resin interfaces protruding to the other side.

EXPLANATION OF REFERENCES

10 lighting device cover
18 emission opening
20 light emitting element
30 diffusion plate
40 shutter
50 light reflective member
52 resin interface
52*a* inner protruding resin interface
52*b* outer protruding resin interface
100 lighting device

The invention claimed is:

1. A lighting device that emits light, the lighting device comprising:

a lighting device cover having an emission opening;

a light emitting element fixed to the lighting device cover, the light emitting element configured to emit the light along a lighting direction from the emission opening toward one side of the lighting device;

a diffusion plate fixed to the lighting device cover so as to be disposed on one side with respect to the light emitting element, the diffusion plate configured to diffuse the light emitted from the light emitting element;

a shutter fixed to the lighting device cover so as to be disposed on one side with respect to the diffusion plate, the shutter configured to change a lighting range of the light diffused by the diffusion plate; and a light reflective member fixed to the lighting device cover so as to be disposed on one side with respect to the shutter, the light reflective member having a resin interface, the resin interface configured to totally reflect a part of the light having passed through the shutter and then to emit the part of the light along the lighting direction, wherein the light reflective member includes, on one side, a transmission interface through which the light is allowed to pass, wherein the resin interface includes:

an inner protruding resin interface formed so as to surround an outer periphery of the emission opening and protruding toward another side, and an outer protruding resin interface formed so as to surround an outer periphery of the inner protruding resin interface and protruding toward another side, wherein the inner protruding resin interface has an inner side surface that reflects again a part of light reflected at the transmission interface and emits the part of light from the transmission interface in a lighting direction, and wherein the outer protruding resin interface has an outer side surface that reflects again a part of light reflected at the transmission interface and emits the part of light from the transmission interface in a lighting direction.

2. The lighting device according to claim 1, wherein the light emitting element includes:

a plurality of first LEDs having a first color temperature, and a plurality of second LEDs having a second color temperature, and wherein the first LEDs and the second LEDs are alternately arranged.

3. The lighting device according to claim 1, wherein the shutter is configured to change a lighting range of the light in a plurality of stages.

* * * * *